J. E. HENEGAR.
SELF LOCKING WASHER.
APPLICATION FILED MAR. 26, 1919.
1,332,626.
Patented Mar. 2, 1920.
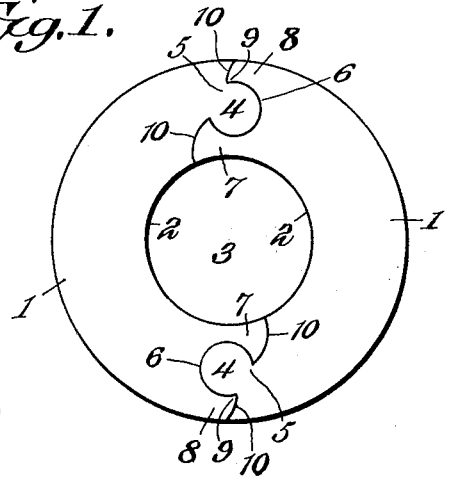
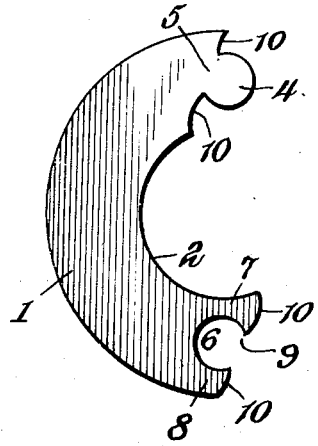 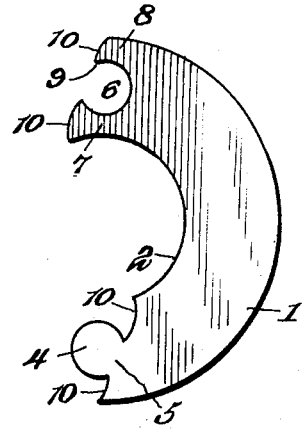
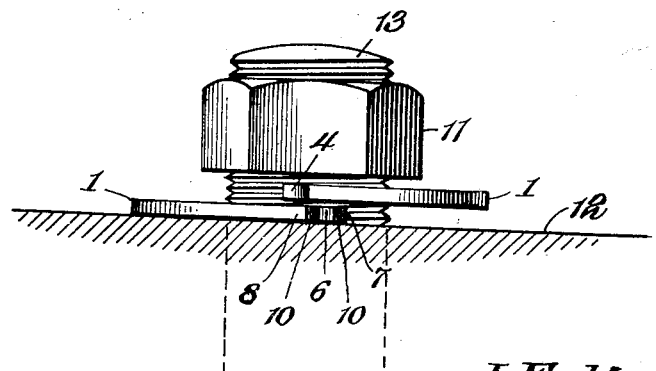
WITNESSES
J. E. Henegar,
INVENTOR,
BY
ATTORNEY

UNITED STATES PATENT OFFICE.

JAMES E. HENEGAR, OF VANDALIA, MISSOURI.

SELF-LOCKING WASHER.

1,332,626.     Specification of Letters Patent.     Patented Mar. 2, 1920.

Application filed March 26, 1919. Serial No. 285,225.

*To all whom it may concern:*

Be it known that I, JAMES E. HENEGAR, a citizen of the United States, residing at Vandalia, in the county of Audrain and State of Missouri, have invented new and useful Self-Locking Washers, of which the following is a specification.

This invention relates to washers and particularly to that class known as sectional washers, consisting of two like members capable of being interchanged and of being applied to a bolt, shaft, vehicle wheels or similar objects at any point desired without the necessity of removing any of the parts connected therewith.

The object is to provide such a washer of such simple formation as to be readily stamped out from the proper sheet metal as in the case of ordinary washers and, by the same operation, to sever the same at diametrically opposite points, providing the joints thus formed with interlocking means that will effectually prevent any lateral displacement of the two parts when once properly fitted in place beneath a nut or other holding means.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed or modified so long as such changes or modifications mark no material departure from the salient features of the invention, as specifically pointed out in the appended claim.

In the drawing, in which like reference characters designate corresponding parts throughout the several figures;

Figure 1 is a plan view of a washer constructed in accordance with the invention.

Fig. 2 is a detached view of one of the members composing the washer.

Fig. 3 is a similar view of the other member thereof and,

Fig. 4 is a detail side elevation of the threaded end of a bolt, showing the manner of applying the sectional washer thereto, after the binding nut has been slightly turned to provide space therefor.

In the drawing there is shown a sectional washer consisting of two equal, duplicate semi-circular parts 1—1, struck from suitable sheet metal of the necessary thickness or gage to suit the size of the particular washer desired, and each provided with a semi-circular recess 2 which, when the parts are properly fitted together, combine to form a circular opening 3 for the passage of a bolt, shaft or other part or member to which the washer may be applied.

Each part or half of the washer is provided, at one of its ends, with a circumferentially extending lobe-like lug 4 in the form of a circular projection formed integrally with the part 1 and of even thickness therewith, the said lug 4 being narrower at its point of juncture with the part 1 than its full diameter, thus providing a reduced neck 5 for a purpose to be explained.

At the opposite end of each semi-circular part 1, there is provided a socket or recess 6 of circular formation, exactly corresponding to and adapted to receive and snugly fit the lug 4 of the opposite member 1, when the parts are fitted together. Inner and outer tongues or projections 7 and 8 respectively are thus formed by the socket or recess 6, the opposed ends of said tongues where approaching each other, defining a narrowed entrance or throat 9 corresponding to and fitting the reduced neck 5 of the opposite, co-acting end of the other half or part 1. The tongue 7 is of greater length than the tongue 8, this being due to the fact that the socket 6 is disposed nearer to the bolt opening 3 than to the outer circumference of the washer. The increased length of the tongue 7 causes the line of division between the sections of the washer to be broken or interrupted and not arranged on a straight line radial to the axis of the washer, as in prior constructions of sectional washers which have been proposed.

The end walls of each half or part 1, which extend from the outer periphery of said part 1 to its inner semi-circular recess 2 and intersected by the lug 4 or the recess 6, as the case may be, are preferably curved as indicated at 10, and it will be seen that the two parts when applied to each other in interlocking relation form, in effect, a continuous washer with flat smooth upper and lower surfaces and having no gaps or openings therethrough and capable of all the uses of an ordinary washer. The circular shape of the projection 4 and the recess 6 is of special importance, as it reduces the number of angles in forming the locking joint between the sections of the washer.

The two parts are applied to each other as illustrated in Fig. 4 of the drawing, wherein the nut 11 is shown elevated a sufficient distance above its bearing surface 12, indicative of any object or member through which a bolt 13 may be passed, to allow of the two parts 1—1 to be applied to each other longitudinally of their axes, when they are brought flush and the nut 11 screwed tight against the same in binding relation thereto. The showing in Fig. 4 may be considered to represent a case where it is difficult to remove the nut from the bolt and where it is desired to place a washer to take up play or for any other reason.

The invention comprises a two-piece, self-locking washer which may be used in emergencies in taking up space on bolts or on line shafts and in many other places as will be readily understood, and its chief advantage resides in the fact that it can be used without removing the nut from the bolt, or the boxing from shafts or other places where it is difficult to remove the same. The washer has been found to be admirably adapted as a tire tightener on wooden-spoked vehicle heels, where it is only necessary to apply one of the sectional washers to the end of each spoke, around the reduced dowel or tenon, between the shoulder thereon and the inner face of the felly to take up the slack between the said spokes and felly.

From the foregoing it will be seen that an extremely simple sectional washer has been devised, which may be readily manufactured and sold at a low cost, and that the same may perform the functions of an ordinary washer, with the added advantage of being capable of ready application upon a bolt, shaft or analogous object without the necessity of removing any attached part therefrom.

What is claimed is:—

A sectional washer comprising two duplicate, interchangeable substantially semicircular parts or members adapted to be fitted together to form an annular ring washer, each part or member having at one end a circumferentially extending lobe of even thickness therewith and integrally connected thereto by a relatively narrow neck, and at the other end a correspondingly shaped socket, the walls of said socket forming inner and outer tongues, the outer ends of which approach each other defining a relatively narrow entrance opening for the socket, the lobe and socket being of partially circular form, each socket being adapted to surround the lobe of the other member more than half of its circumference and to prevent lateral separation of the parts when in interlocked relation and the inner tongue being longer than the outer tongue, whereby the line of division of the washer is not radial to the axis thereof at either end.

In testimony that I claim the foregoing as my own I have hereto affixed my signature.

JAMES E. HENEGAR.